United States Patent [19]
Bartlett et al.

[11] Patent Number: 5,337,212
[45] Date of Patent: Aug. 9, 1994

[54] FLIP SCREEN FOR NOTEBOOK COMPUTERS

[75] Inventors: Richard A. Bartlett, Middletown; Edward A. Coté, Califon, both of N.J.

[73] Assignee: NCR Corporation, Dayton, Ohio

[21] Appl. No.: 144,914

[22] Filed: Oct. 28, 1993

Related U.S. Application Data

[62] Division of Ser. No. 973,507, Nov. 9, 1992, Pat. No. 5,246,589.

[51] Int. Cl.⁵ .................. H05K 7/02; G06F 1/16
[52] U.S. Cl. ........................... 361/681; 248/920
[58] Field of Search .............. 248/278, 461, 917–923, 248/274, 286; 364/708.1; 345/169, 905; 361/681–683; 312/223.2

[56] References Cited

U.S. PATENT DOCUMENTS

| | | |
|---|---|---|
| 4,589,659 | 5/1986 | Yokoi et al. |
| 5,085,394 | 2/1992 | Torii . |
| 5,103,376 | 4/1992 | Blonder . |
| 5,105,335 | 4/1992 | Honda . |
| 5,161,028 | 11/1992 | Kawata et al. |
| 5,173,686 | 12/1992 | Fujihara . |
| 5,224,060 | 6/1993 | Ma . |

FOREIGN PATENT DOCUMENTS

| | | | |
|---|---|---|---|
| 454120 | 10/1991 | European Pat. Off. | G06F 1/16 |
| 4-188208 | 7/1992 | Japan . | |

*Primary Examiner*—Leo P. Picard
*Assistant Examiner*—Michael W. Phillips
*Attorney, Agent, or Firm*—Paul J. Maginot

[57] ABSTRACT

A flip screen for notebook computers which pivots about a horizontal axis to position a pen input and display side of the screen in various ergonomic writing positions. The flip screen fits within a frame portion and is equipped with left and right pivot pins. The frame portion has corresponding apertures or channels for receiving the pins and holding the screen in place. The apertures are elongated in shape and extend substantially the entire length of the frame portion. The flip screen pivots and slides about the pivot pins to place the pen input and display side in a first position facing upwards when the frame portion is closed upon a base portion or a second position facing the base portion when the frame portion is opened from the base portion.

2 Claims, 5 Drawing Sheets

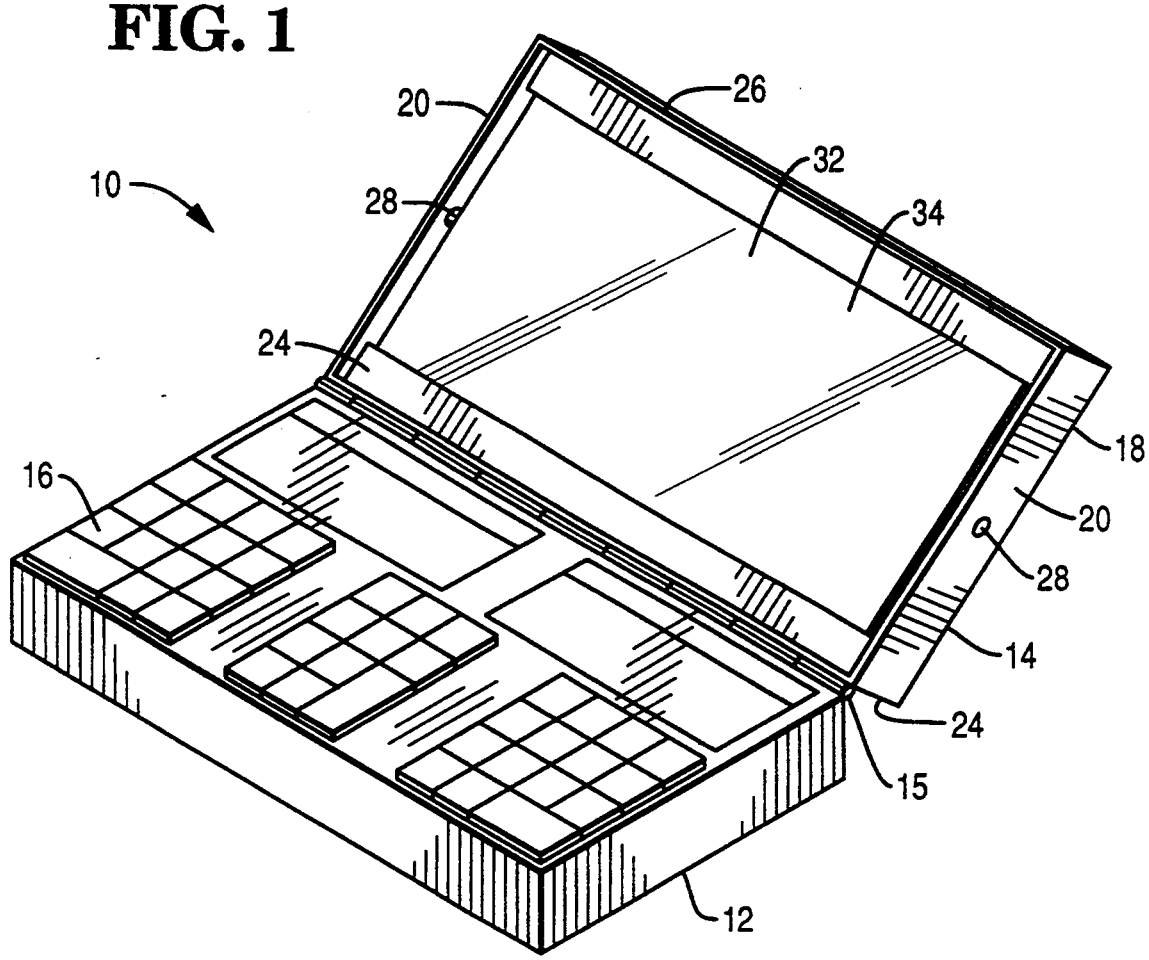
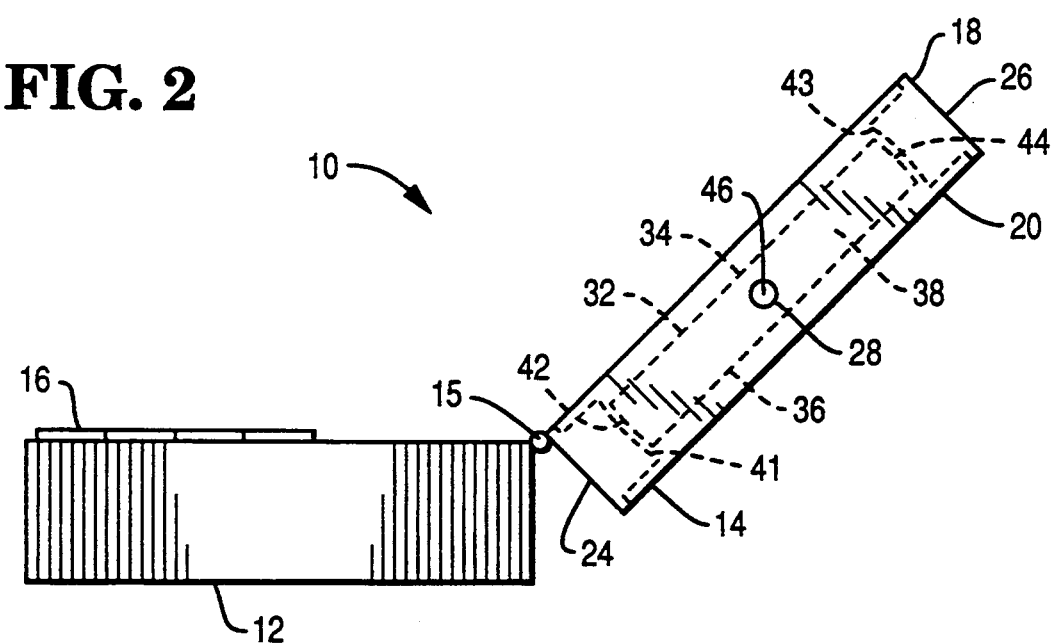

FLIP SCREEN FOR NOTEBOOK COMPUTERS

This application is a division of application Ser. No. 07/973,507, filed Nov. 9, 1992, now U.S. Pat. No. 5,246,589.

BACKGROUND OF THE INVENTION

The present invention relates to notebook computers and computer screens, and more specifically to a flip screen for notebook computers.

Portable notebook computers are well-known in the art. They typically include a keyboard portion having most of the parts required by a computer, and a display portion which is hinged to the keyboard section.

Pen computing capability is rapidly becoming desirable for all types of portable computers, including notebook computers. However, incorporating pen computing capability into notebook computer displays would not provide an ergonomic writing surface.

Therefore, it would be desirable to provide a mechanism for flipping the screen of a notebook computer outwards so as to provide an ergonomic writing surface when the notebook computer is closed.

SUMMARY OF THE INVENTION

In accordance with the teachings of the present invention, a flip screen for notebook computers is provided. The flip screen fits within a frame portion of a portable notebook computer and has display and pen input computing capabilities. The flip screen is equipped with pivot pins on either side. The frame portion has corresponding apertures or channels for receiving the pins and holding the screen in place.

In one embodiment, the screen rotates about a horizontal axis formed by the pivot pins in order to place the display and pen input computing side of the screen on the outside of the computer in an ergonomic writing position.

In another embodiment, the apertures or channels extend a predetermined distance along the sides of the frame portion so as to allow the pivot pins to slide up or down in the apertures while the screen pivots about the pins, in order to flip the screen to the outside of the computer in an ergonomic writing position.

In yet another embodiment, the apertures or channels extend a predetermined distance along the sides of the frame portion, or a detent is provided to the second embodiment, so as to allow the pivot pins to slide up or down in the apertures while the screen pivots about the pins, in order to flip the screen to an inclined position between the leading edge of the keyboard and the lid in an ergonomic writing position.

It is accordingly an object of the present invention to provide flip screen for a notebook computer.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 1 is a perspective view of a notebook computer having a flip screen under a first embodiment of the present invention;

FIG. 2 is a side view of the notebook computer of FIG. 1;

DETAILED DESCRIPTION OF THE PREFERRED EMBODIMENT

Figure 3:
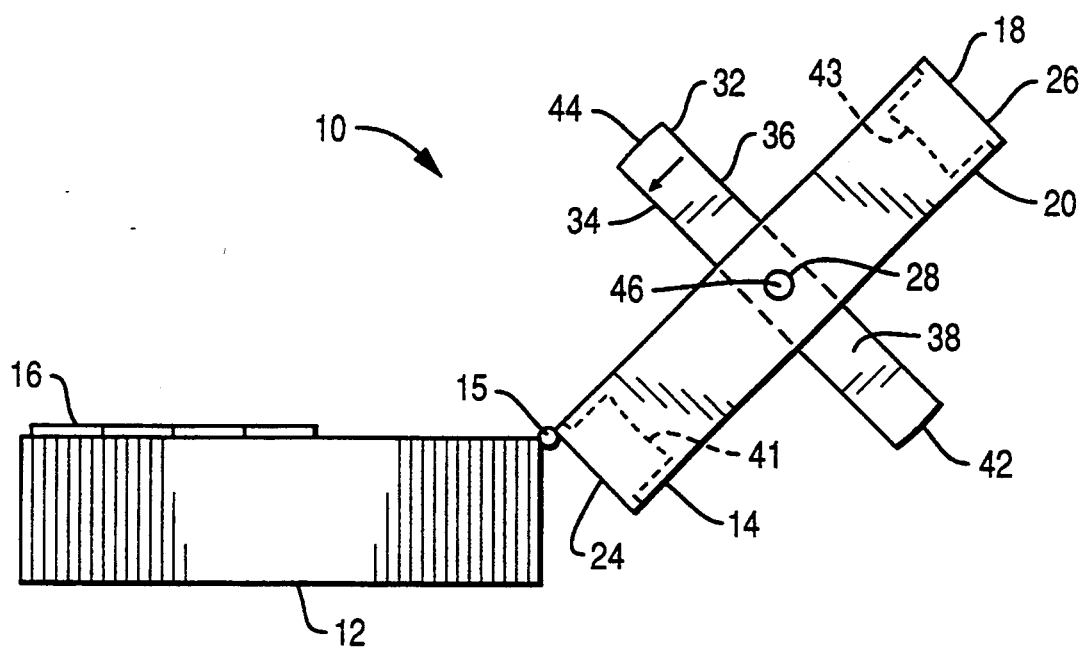
FIG. 3 is a side view of the notebook computer of FIG. 1, with the flip screen in an intermediate position.

Referring now to FIGS. 1–4, a first embodiment of the present invention is shown. Notebook computer 10 includes base portion 12 and screen portion 14, hinged along one edge by hinge 15. Base portion 12 includes keyboard 16 and may contain most of the computer hardware, such as disk drives, boards, and power supply.

Screen portion 14 includes a frame member 18 having left and right vertical portions 20, and top and bottom horizontal portions 26 and 24. Under the first embodiment, vertical portions 20 include centrally located circular apertures 28. Top and bottom horizontal portions 26 and 24 have rounded surfaces 41 and 43 which have a radius of curvature extending from the center of apertures 28.

Screen portion 14 also includes screen 32, which has a display and pen input side 34 and a back side 36, which is part of the exterior case of computer 10. Screen 32 has vertical sides 38, and horizontal sides 42 and 44, which have the same curvature as surfaces 41 and 43 of top and bottom horizontal surfaces 26 and 24. Under the first embodiment, vertical sides 38 include centrally located hinge pins 46, which fit within apertures 28 of frame member 18. Apertures 28 may extend entirely through vertical portions 20, or partially through vertical portions 20 to form channels. Thus, screen 32 pivots about a central horizontal axis within frame member 18.

Figure 4:
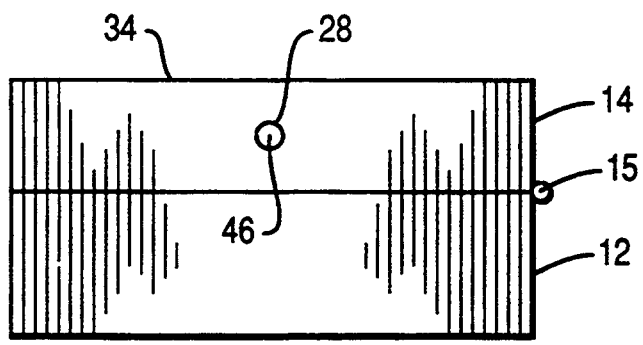
FIG. 4 is a side view of the notebook computer of FIG. 1, with the flip screen facing upwards and the notebook computer in a closed position.
Figure 5:
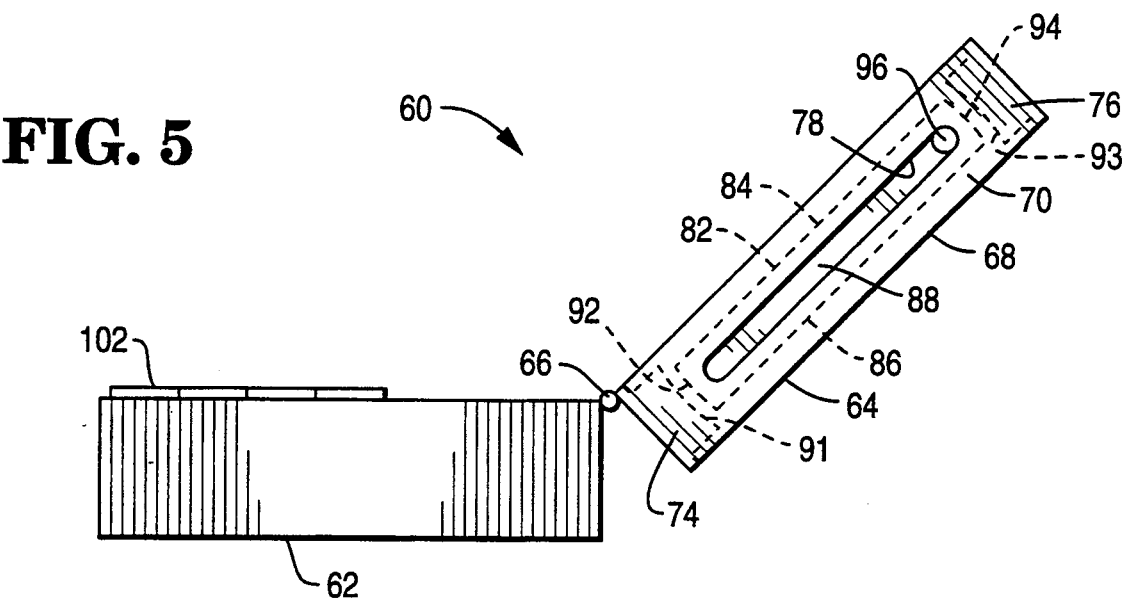
FIG. 5 is a side view of a notebook computer similar to the notebook computer of FIG. 1, having a flip screen under a second embodiment of the present invention.

Turning now to FIGS. 3 and 4, screen 32 may be rotated about pins 46 to be closed upon base portion 12, with display and pen input side 34 facing upwards, in order to form a comfortable writing surface. It is understood that the flipping operation as shown and described may be performed in reverse to place display and pen input side 34 in the open position of FIG. 1 for use with keyboard 16.

Referring now to FIGS. 5–9, a second embodiment of the present invention is shown. Like the notebook computer 10 of the first embodiment, notebook computer 60 of the second embodiment includes base portion 62 and screen portion 64, hinged at hinge 66. Screen portion 64 includes a frame member 68 having vertical portions 70, and horizontal portions 74 and 76. Under the second embodiment, vertical portions 70 include apertures 78, which extend substantially the length of screen 82. Horizontal portions 74 and 76 have rounded surfaces 91 and 93 which have a radius of curvature extending from the center of apertures 78.

Screen 82 has a display and pen input side 84 and a back side 86. Screen 82 has vertical sides 88, and horizontal sides 92 and 94, which have the same curvature as surfaces 91 and 93 of horizontal portions 74 and 76. Under the second embodiment, vertical sides 88 include hinge pins 96, which are close to horizontal side 94, and which fit within apertures 78 of frame member 18. Apertures 78 may extend entirely through vertical portions 70, or partially through vertical portions 70 to form channels. Thus, screen 82 slides vertically within frame member 68 and pivots about a horizontal axis within frame member 68.

Figure 6:
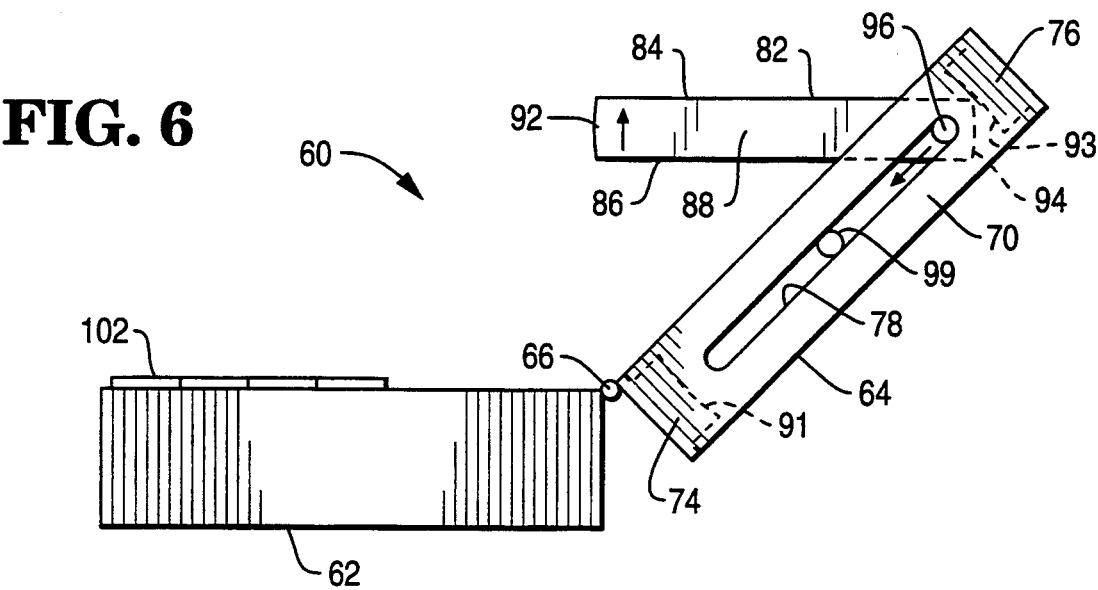
FIG. 6 is a side view of the notebook computer of FIG. 5, with the flip screen in a first intermediate position.
Figure 7:
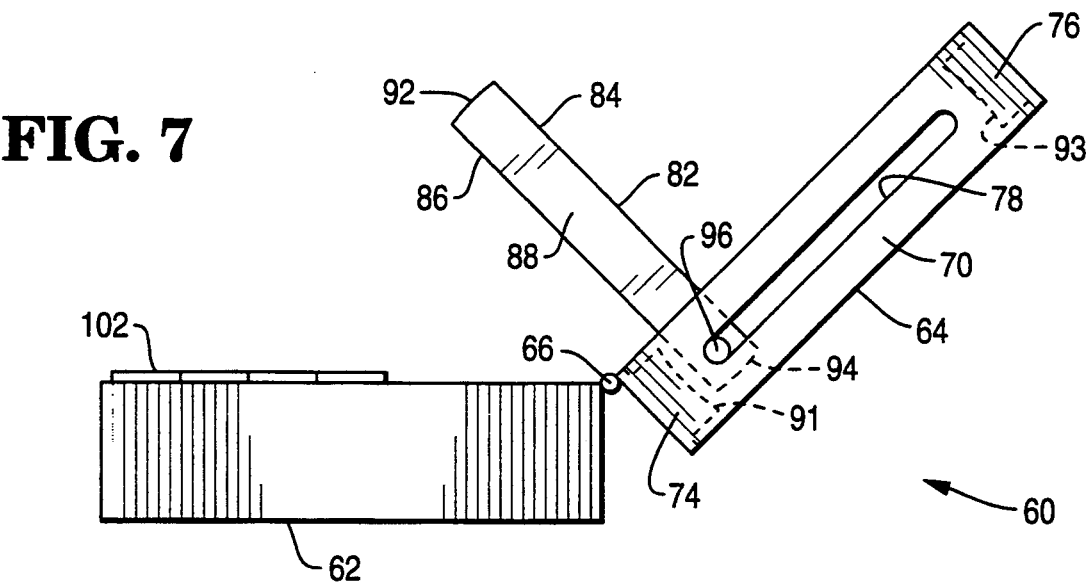
FIG. 7 is a side view of the notebook computer of FIG. 5, with the flip screen in a second intermediate position.
Figure 8:
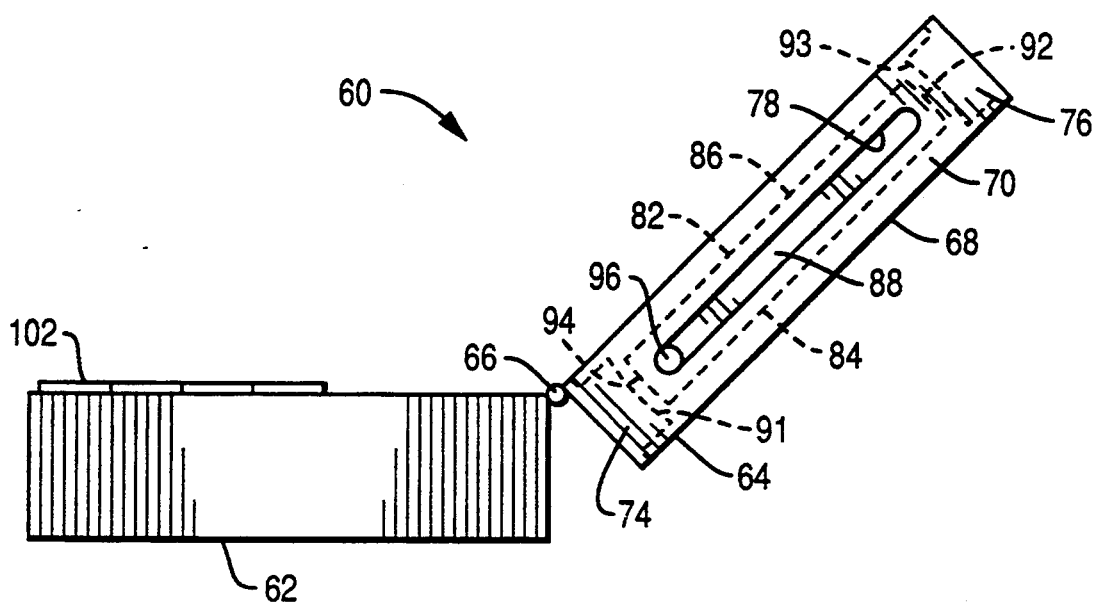
FIG. 8 is a side view of the notebook computer of FIG. 5, with the flip screen facing outwards in a third position.
Figure 9:
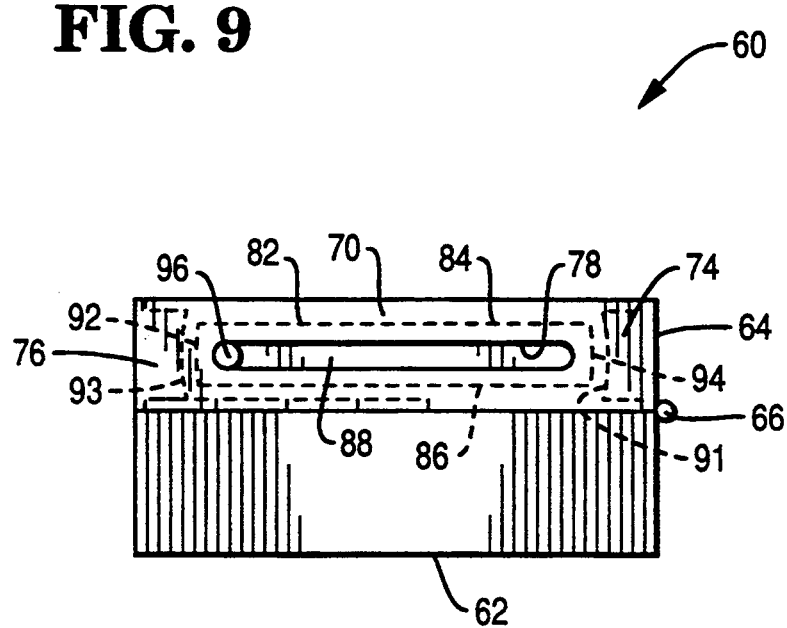
FIG. 9 is a side view of the notebook computer of FIG. 5, with the flip screen facing up and the notebook computer in a closed fourth position.

FIGS. 6-8 illustrate the flipping operation which results in display and pen input side 84 being face up in FIG. 9. With reference to FIG. 6, pins 96 are shown in the highest position within apertures 78. Screen 82 is rotated inwards towards keyboard 102.

With reference to FIG. 7, pins 96 are moved towards the lowest position of apertures 78.

With reference to FIG. 8, screen 82 is rotated upwards towards and into frame member 68 so that display and pen input side 84 is facing outwards.

With reference to FIG. 9, notebook computer 60 is shown in the closed position with display and pen input side 84 facing upwards, in order to form a comfortable writing surface. It is understood that the flipping operation as shown and described may be performed in reverse to place display and pen input side 84 in the open position of FIG. 5 for use with keyboard 102.

Figure 10:
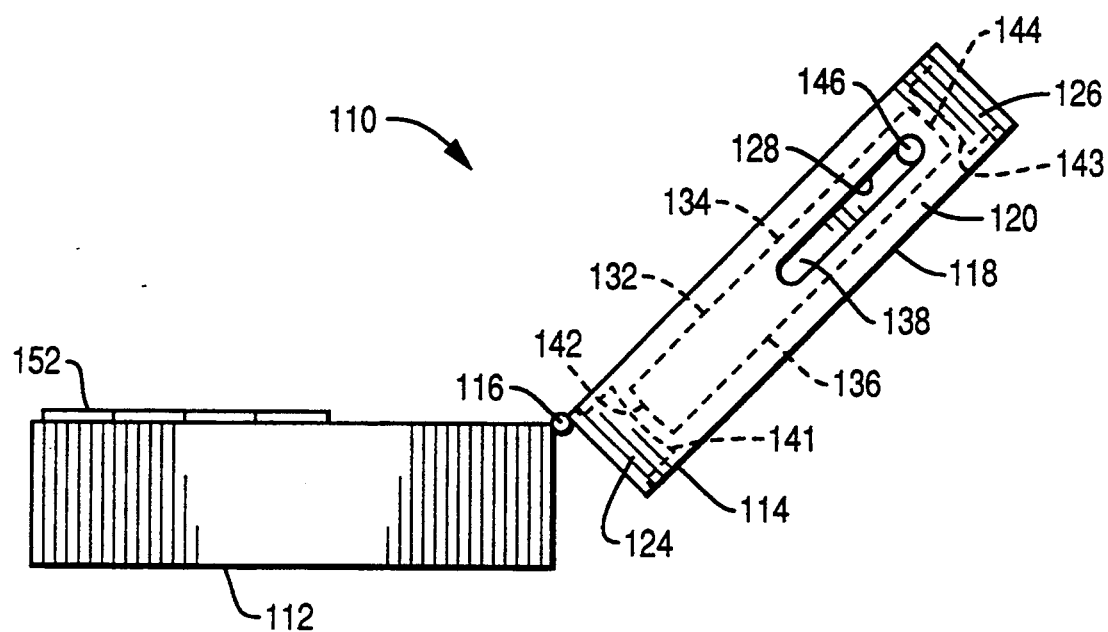
FIG. 10 is a side view of a notebook computer similar to the notebook computer of FIG. 1, having a flip screen under a third embodiment of the present invention.
Figure 11:
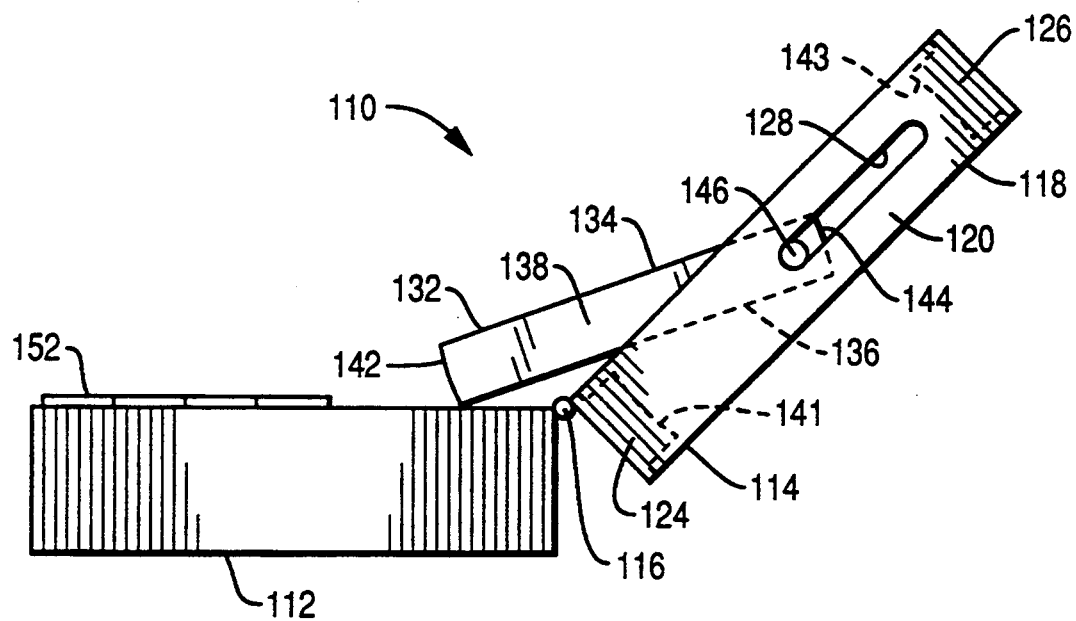
FIG. 11 is a side view of the notebook computer of FIG. 10, with the flip screen facing up and the notebook computer in an open position.

Referring now to FIGS. 10-11, a third embodiment based upon the second embodiment of the present invention is shown. Like the notebook computer 10 of the second embodiment, notebook computer 110 of the second embodiment includes base portion 112 and screen portion 114, hinged at hinge 116. Screen portion 114 includes a frame member 118 having vertical portions 120, and horizontal portions 124 and 126. Under the third embodiment, vertical portions 120 include apertures 128, which extend about halfway down the length of vertical portions 120 from the top horizontal side 126. Alternatively, the second embodiment of FIGS. 5-9 may be modified to include a pair of detents 99 approximately halfway down apertures 78 of vertical portions 70. Detents 99 are shown only in FIG. 6. Horizontal portions 124 and 126 have rounded surfaces 141 and 143 which have a radius of curvature extending from the center of apertures 138.

Screen 132 has a display and pen input side 134 and a back side 136. Screen 132 has vertical sides 138, and horizontal sides 142 and 144, which have the same curvature as surfaces 141 and 143 of horizontal portions 124 and 126. Under the second embodiment, vertical sides 138 include hinge pins 146, which are close to horizontal side 144, and which fit within apertures 128 of frame member 118. Apertures 128 may extend entirely through vertical portions 120, or partially through vertical portions 120 to form channels. Thus, screen 132 slides vertically within frame member 118 and pivots about a horizontal axis within frame member 118.

FIG. 11 illustrates the position of screen portion 132 after the flipping operation. Display and pen input side 134 is inclined at an angle to base portion 112. Pins 146 are shown in the lowest position within apertures 128. Screen 132 is rotated downwards towards keyboard 152, in order to form a comfortable writing surface.

Although the present invention has been described with particular reference to certain preferred embodiments thereof, variations and modifications of the present invention can be effected within the spirit and scope of the following claims.

What is claimed is:

1. A notebook computer comprising:
   a base portion;
   a display portion hinged to the base portion including a frame and a display within the frame;
   wherein the frame has top and bottom internal sides, and left and right internal sides containing left and right apertures;
   wherein the display has left, right, back cover, and front pen input and display sides;
   wherein the display further includes left and right pivot pins on the left and right sides of the display and within the left and right apertures for pivotally mounting the frame about a horizontal axis within the frame;
   wherein the left and right apertures within the left and right internal sides are elongated in shape and extend substantially the entire length of the left and right internal sides, wherein the left and right pivot pins are located closer to either the bottom or top side of the display, and wherein the display pivots and slides about the pivot pins to place the display and pen input side in a first position facing upwards when the display portion is closed upon the base portion or a second position facing the base portion when the display portion is opened from the base portion.

2. The notebook compute as recited in claim 1, further comprising left and right detents within the left and right apertures, wherein the display pivots and slides about the pivot pins to place the display and pen input side in a third position inclined upwards from the base portion with the bottom side of the display resting on the base portion.

* * * * *

UNITED STATES PATENT AND TRADEMARK OFFICE
CERTIFICATE OF CORRECTION

| | |
|---|---|
| PATENT NO. | : 5,337,212 |
| APPLICATION NO. | : 08/144914 |
| DATED | : August 9, 1994 |
| INVENTOR(S) | : Bartlett et al. |

Page 1 of 1

It is certified that error appears in the above-identified patent and that said Letters Patent is hereby corrected as shown below:

Cover Page
Item (62), Related U.S. Application Data, please replace "Division of Ser. No. 973,507, Nov. 9, 1992, Pat. No. 5,246,589." with --Division of Ser. No. 973,507, Nov. 9, 1992, Pat. No. 5,276,589.--.

Signed and Sealed this

Twenty-first Day of September, 2010

David J. Kappos
*Director of the United States Patent and Trademark Office*